(12) United States Patent
Mulch et al.

(10) Patent No.: US 8,464,985 B2
(45) Date of Patent: Jun. 18, 2013

(54) ATTACHMENT DEVICE FOR ELONGATED MEMBER

(76) Inventors: Steven D. Mulch, Butler, MO (US);
Theresa A. Mulch, Butler, MO (US);
Travis M. Mulch, Butler, MO (US)

( * ) Notice: Subject to any disclaimer, the term of this patent is extended or adjusted under 35 U.S.C. 154(b) by 525 days.

(21) Appl. No.: 12/510,012

(22) Filed: Jul. 27, 2009

(65) Prior Publication Data

US 2010/0090073 A1 Apr. 15, 2010

Related U.S. Application Data

(63) Continuation-in-part of application No. 29/326,189, filed on Oct. 14, 2008, now Pat. No. Des. 597,963.

(51) Int. Cl.
*F16L 3/22* (2006.01)

(52) U.S. Cl.
USPC .............. 248/68.1; 248/73; 248/65; 174/664; 174/68.1

(58) Field of Classification Search
USPC .............. 248/684, 683, 547, 79, 71, 73, 74.1, 248/68.1, 65, 49, 58, 72, 74.5, 309.1, 317; 174/480, 481, 60, 61, 64, 100, 135, 68.1, 174/99 R; 24/458; 439/527; 285/152.1, 61; 138/106, 107

See application file for complete search history.

(56) References Cited

U.S. PATENT DOCUMENTS

| | | | | |
|---|---|---|---|---|
| 2,404,531 | A * | 7/1946 | Robertson | 248/68.1 |
| 4,099,626 | A * | 7/1978 | Magnussen, Jr. | 211/60.1 |
| D282,538 | S | 2/1986 | Loof et al. | |
| D285,192 | S | 8/1986 | Hubbard et al. | |
| 5,060,892 | A * | 10/1991 | Dougherty | 248/57 |
| 5,090,645 | A * | 2/1992 | Zuercher | 248/68.1 |
| 5,213,155 | A * | 5/1993 | Hahn | 165/162 |
| 5,615,850 | A * | 4/1997 | Cloninger | 248/68.1 |
| 5,836,130 | A * | 11/1998 | Unruh et al. | 52/698 |
| D402,262 | S | 12/1998 | Scherer et al. | |
| D404,010 | S | 1/1999 | Viklund et al. | |
| 5,971,329 | A * | 10/1999 | Hickey | 248/68.1 |
| 5,992,802 | A * | 11/1999 | Campbell | 248/68.1 |
| 6,191,363 | B1 * | 2/2001 | Samuels | 174/68.3 |
| 6,902,138 | B2 * | 6/2005 | Vantouroux | 248/68.1 |
| D539,230 | S * | 3/2007 | Jordan | D13/155 |
| 7,514,630 | B2 * | 4/2009 | Anderson | 174/72 A |
| 7,806,374 | B1 * | 10/2010 | Ehmann et al. | 248/67.5 |

* cited by examiner

Primary Examiner — Todd M. Epps
(74) Attorney, Agent, or Firm — Law Office of Mark Brown, LLC; Mark E. Brown

(57) ABSTRACT

An attachment device is provided for supporting electrical wiring, communications wiring, and piping having an elongated body with first and second surfaces, opposite faces, and opposite ends. One or more transverse passages extend between the faces permitting passage of wiring and piping therethrough. Mounting passages extending between the first and second surfaces permit securing of the attachment device to a structure using fasteners such as a nails, screws, or bolts. Additionally, adhesives can be located on the second surface for securing the device to a structure.

16 Claims, 5 Drawing Sheets

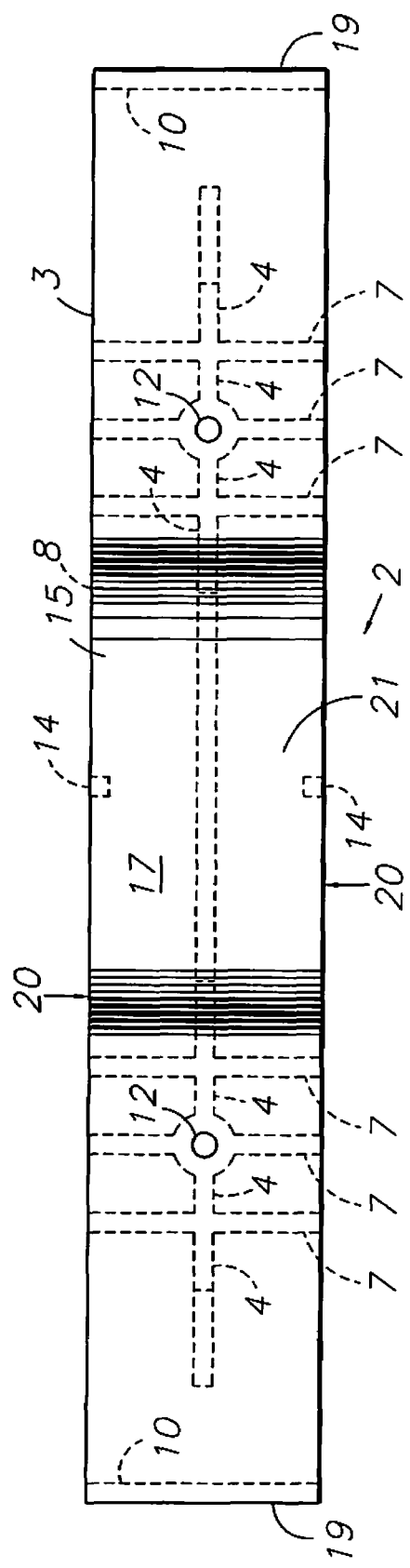
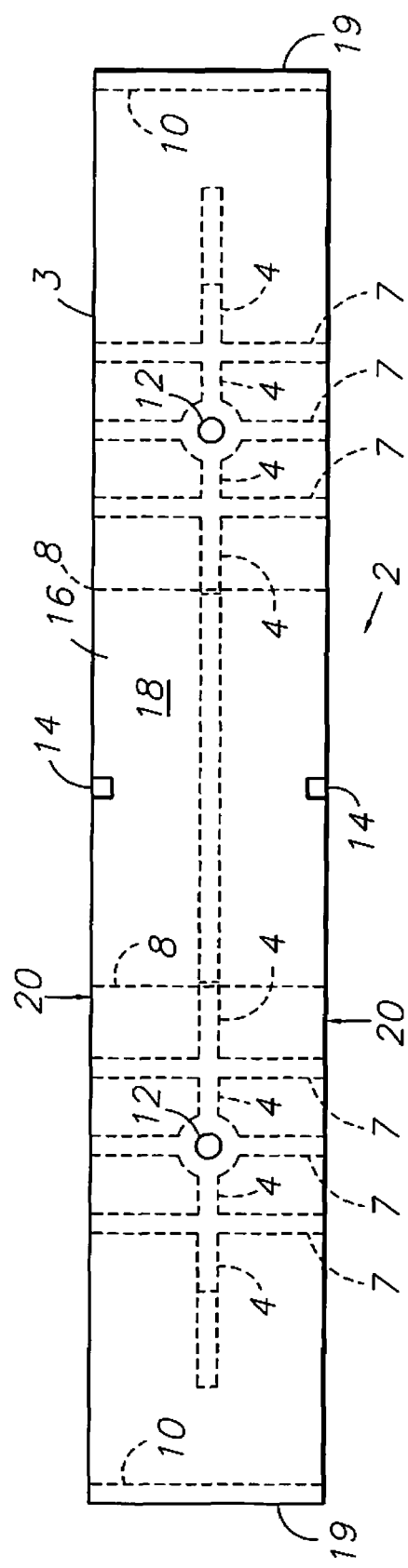

ATTACHMENT DEVICE FOR ELONGATED MEMBER

CROSS-REFERENCE TO RELATED APPLICATION

This application is a continuation-in-part of and claims the benefit of U.S. Design application No. 29/326,189 filed Oct. 14, 2008, the content of which is incorporated by reference herein in its entirety.

BACKGROUND OF THE INVENTION

1. Field of the Invention

The present disclosed technology relates generally to attachment devices for wiring and piping, and in particular to a hanger for routing electrical and communication wiring and rigid and flexible piping.

2. Description of the Related Art

Electrical and communication wiring is installed in residential and commercial buildings to route electrical power to fixtures, appliances and devices, and to provide communication connections among entertainment and computing devices. In addition, rigid and flexible piping is used to route fluid and gasses throughout structures. Typical installations often require long runs of wiring and piping within the interior of the structure to make connections. Such wiring and piping is usually installed between and through structural and supporting members of the building. The wiring and piping may be fastened to a floor joist or wall stud using metal staples or cable clips. Alternatively, holes may be drilled through the floor joists and wall studs, with the wiring and piping fed through, or notches are made in an edge of the structural or supporting member and the wiring and piping is placed and secured within the recess.

As the quantity of fixtures and devices requiring connection by electrical wiring, communication wiring, and piping increases in residential and commercial buildings, traditional methods of installation have become increasingly cumbersome and time consuming. Metal staples and cable clips are susceptible to corrosion that can weaken the attachment, and such corrosion may be transferred to the wire or piping. Moreover, the numerous fasteners that are required to secure long runs of wiring and piping increase the cost of installation and the time necessary to complete the task. Drilling holes and making notches in structural and supporting members of the building weaken the members creating potentially hazardous structural conditions.

What is needed is a device and method for routing electrical wiring, communication wiring, and piping that is easy to install and use and avoids unnecessary damage to supporting structures.

Heretofore there has not been available an attachment device for wiring and piping with the advantages and features of the disclosed subject matter.

BRIEF SUMMARY OF THE INVENTION

An attachment device embodying the principles of the disclosed subject matter includes an elongated rigid body having one or more passages for passing electrical wiring, communication wiring, and piping therethrough. The device is attached to a structure, such as a wall, floor, wall stud, or floor joist, using mechanical fasteners such as nails or threaded fasteners, or with adhesive, thereby avoiding damage to, or weakening of the structure to which it is attached. After the desired number of attachment devices have been installed, wiring and piping is fed through the passages and the appropriate electrical, communication, and piping connections are made.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

FIG. 6 is a top view thereof.

FIG. 7 is a bottom view thereof.

DETAILED DESCRIPTION OF THE PREFERRED EMBODIMENTS

Figure 1:
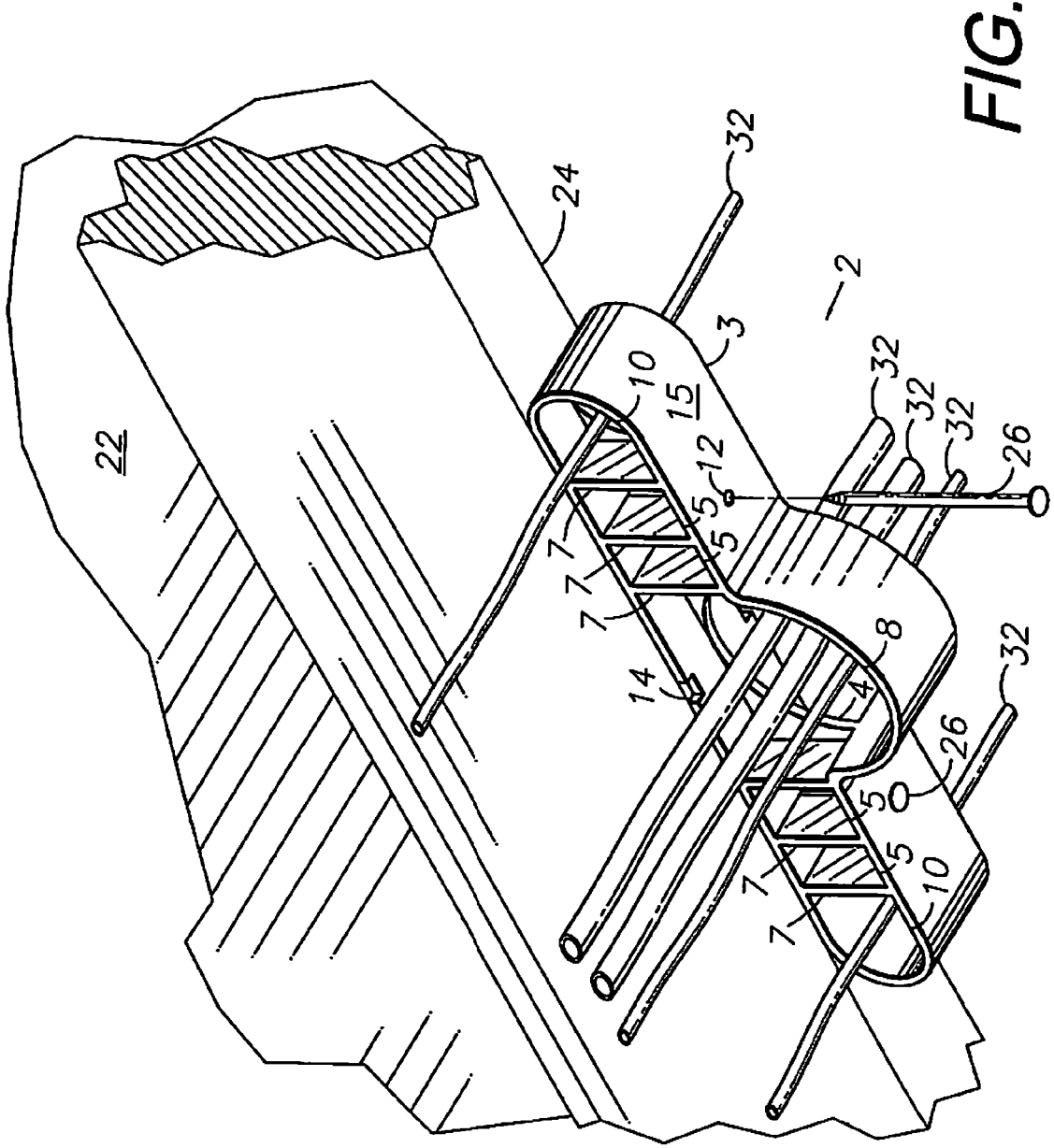
FIG. 1 is an isometric view of a wiring hanger embodying the principles of the disclosed subject matter installed on the exposed edge of a floor joist.

I. Introduction and Environment.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Embodiment or Aspect of the Wiring Hanger 2.

The hanger 2 generally consists of a monolithic, elongated, rigid body 3 having first and second surfaces 17, 18, opposite ends 19, and opposite faces 20. Mounting holes or passages 12 extend between the first and second surfaces 17, 18 and are adapted for receiving a mechanical fastener, such as a nail 26 for securing the hanger 2 to a structure. A center passage 8, and opposite end passages 10 permit passage of wiring 32, such as electrical wiring and communication wiring (e.g., telephone, cable television, data, etc.) (FIGS. 1-2) or elongated cylinders therethrough. While three passages are shown and described, the hanger 2 can have more or less than three passages. The hanger 2 is scalable and may be manufactured of, for example, plastic, metal, nylon or other rigid material. While wiring 32 is shown and described, the hanger 2 can accommodate other types of elongated cylinders and the like, including, but not limited to rigid or flexible pipe. Such piping may carry liquids or gases such as hot and cold water, wastewater, air ventilation, oxygen lines and refrigerant lines.

Figure 2:
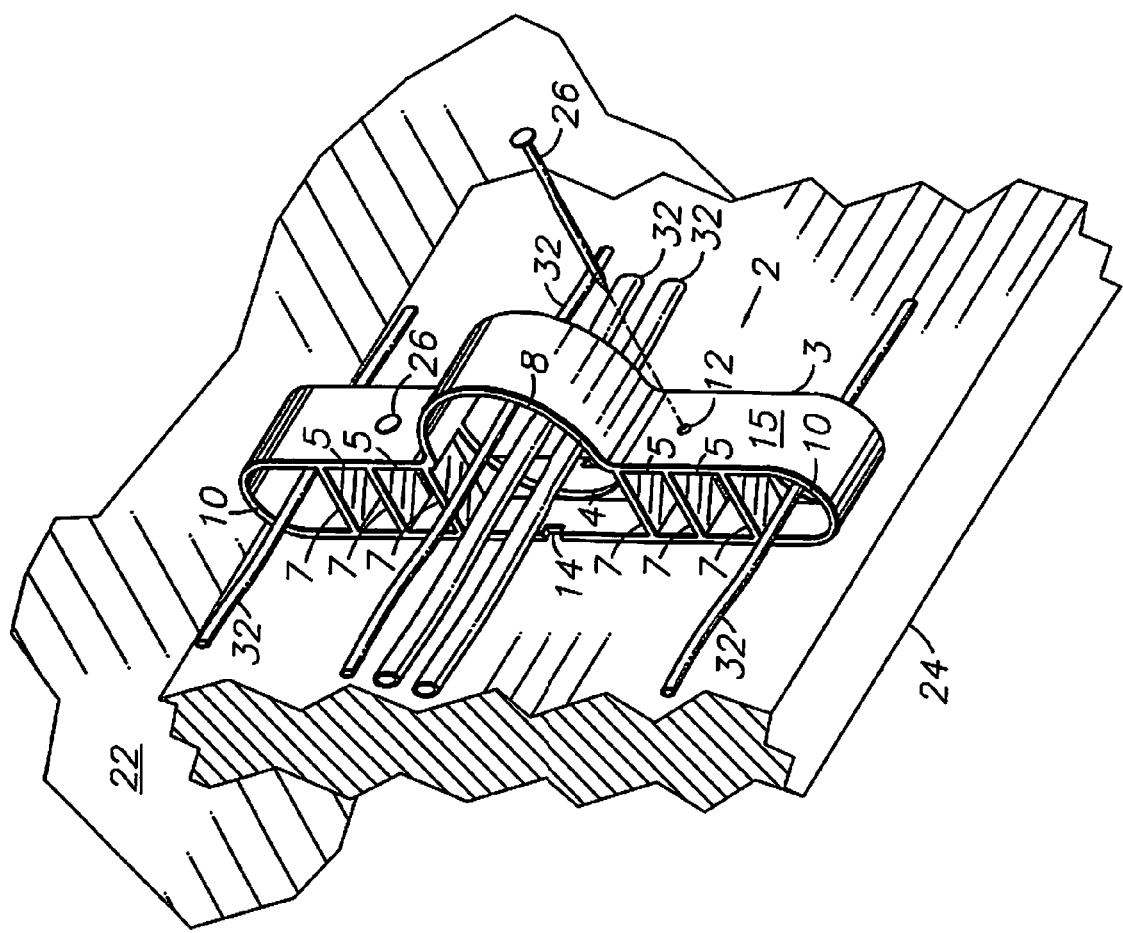
FIG. 2 is an isometric view of a wiring hanger embodying the principles of the disclosed subject matter installed on the side of a floor joist.
Figure 3:
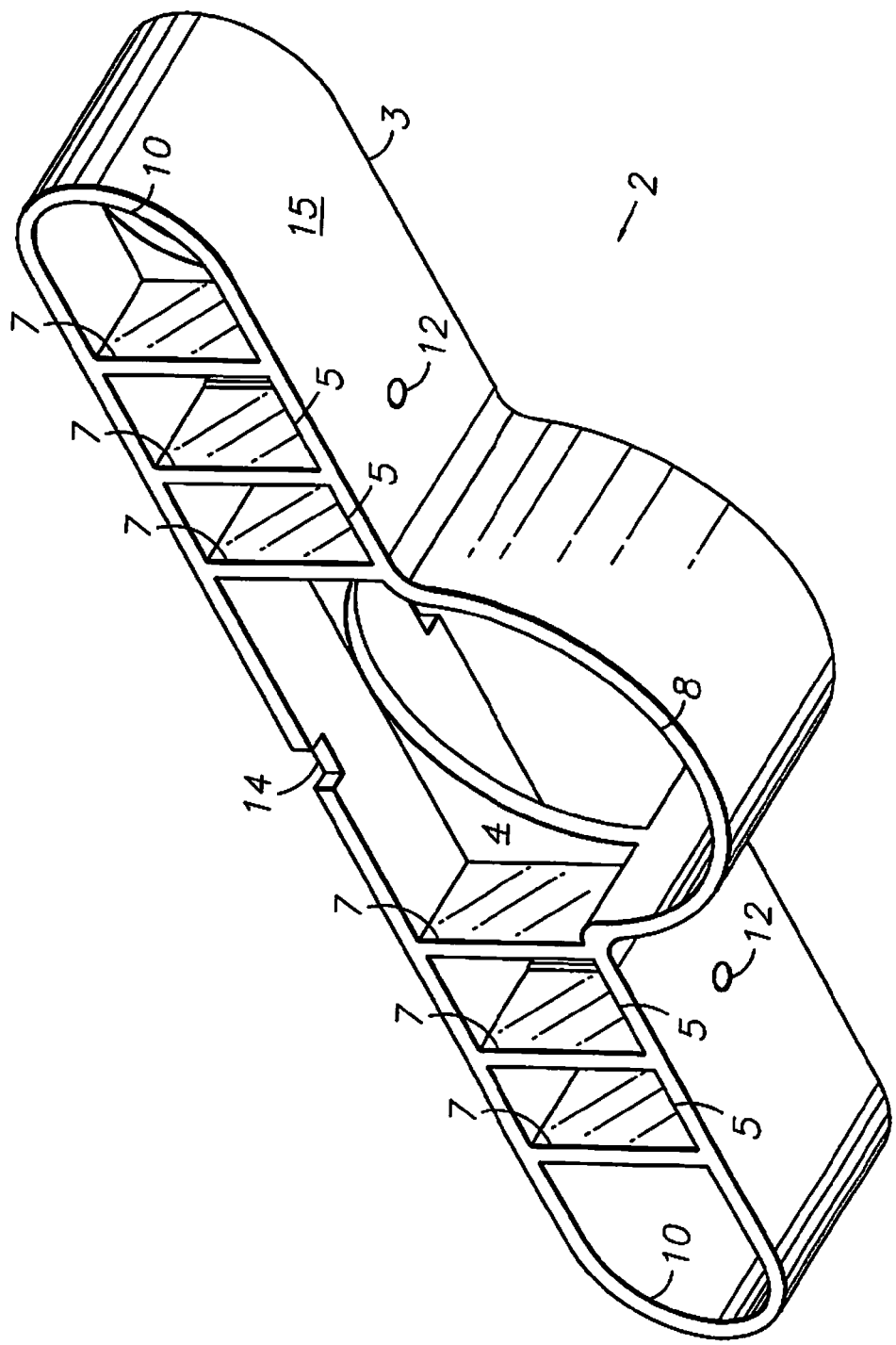
FIG. 3 is an isometric view of a wiring hanger embodying the principles of the disclosed subject matter.
Figure 4:
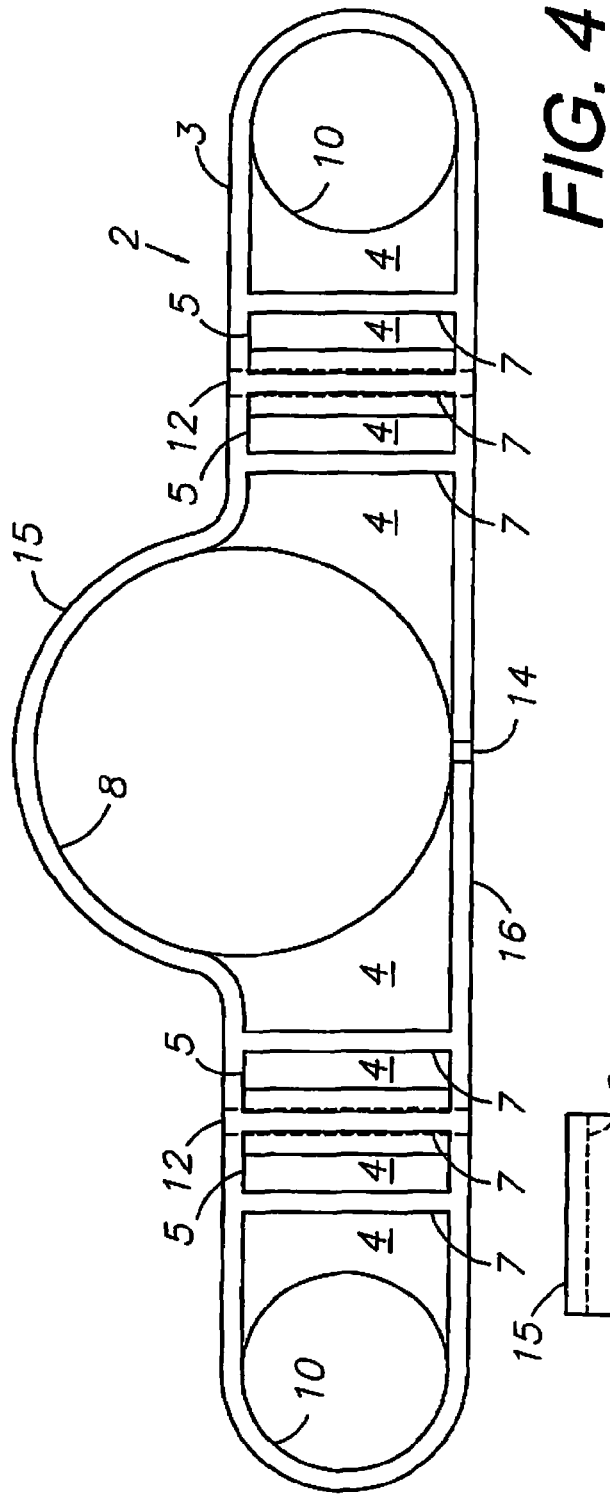
FIG. 4 is an elevational view thereof.
Figure 5:
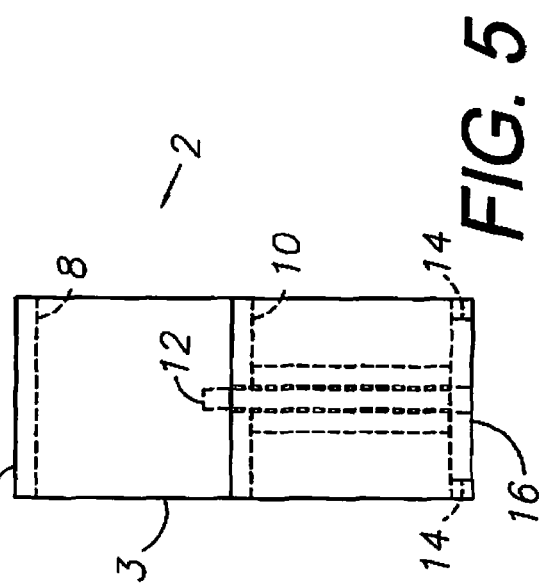
FIG. 5 is an end view thereof.

Referring to FIGS. 1-2, the hanger is shown in use attached to a structure, such as a wooden floor joist 24 depending from the bottom of a floor 22, using nails 26. While the hanger is shown attached to a floor joist 24, it will be appreciated from the following description that that hanger 2 may be attached to any suitable structure capable of receiving mechanical fasteners or adhesives. A center wall 4 spanning a length of the body 3 is intersected by support ribs 7 spanning a width of the body 3 and defining interior cavities 5 opening at the faces 20 and having a generally box-like construction that in turn provides rigidity to the hanger 2. The center and end passages 8, 10 contain circular openings in their respective portions of the center wall 4 permitting passage of wiring 32 therethrough. The circular opening of the center passage 8 is greater than that of the end passages 10 causing a protrusion 21 of a first wall 15. A second wall 16 is generally flat and has a pair of slots 14 located midway between the ends 19 permitting the hanger 2 to be aligned with a marker or chalk line on the structure upon which the hanger 2 is to be attached.

III. Installation and Use.

One or more hangers 2 may be installed on a structure depending on the requirements of the particular application. In new or existing construction, the hangers 2 may be located and installed for immediate or future use. For example, hangers 2 may be installed above drop ceilings, within walls and floors, or left exposed.

The desired route of wiring is usually determined prior to installation. Routing is typically dictated by the location of connections, existing or predicted obstacles, and to keep the wiring away from particular structural elements. As such, routing is usually marked on the structure using a marking pencil or a chalk line. The slot 14 facilitates centering the hanger 2 on the routing line. Absent a routing line, the location of the hanger 2 is determined by the installer.

The hanger 2 may be attached to any building structure capable of receiving mechanical fasteners or adhesives including, but not limited to, wood, concrete, metal or masonry. The structure receiving the hanger 2 may be unfinished, or it may contain pre-drilled holes for receiving a threaded fastener or for passing a fastener therethrough. Although a nail 26 is shown and described, alternative types of mechanical fasteners may also be used including, but not limited to, threaded screws, pins, rivets, and nut and bolt combinations. Moreover, adhesives, or hook and loop fasteners may be placed on the second surface 18 of the hanger 2 to attach it to a structure. Alternatively, a combination of mechanical fasteners and adhesives may be used in combination to secure the hanger 2 to a structure.

After the desired number of hangers 2 have been installed, wiring 32 may be freely run through the passages 8, 10 and the appropriate electrical and communication connections made.

It will be appreciated that the hanger 2 can be used for various other applications. Moreover, the hanger 2 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A device for attaching an elongated member to a structure, which device comprises:
   an elongated, contiguous body;
   said body having a first surface, a second surface, opposite faces, and opposite ends;
   said first surface including a protrusion located between said ends, said protrusion protruding outwardly from said body and said first surface ends in a direction away from said second surface;
   a center passage located between said ends and extending between and open at said faces, said center passage being adapted to receive the elongated member extending through said body;
   a fastener associated with said body second surface and adapted for fastening said body at said second surface to the structure;
   a pair of end passages located at said ends of said body and extending between said body faces and providing a pair of transverse openings through said body;
   said body having a center wall, said center wall extending between said first and second surfaces bisecting said body, said center wall spanning a length of said body;
   said body having a support rib, said support rib extending between said first and second surfaces intersecting said center wall, said support rib spanning a width of said body;
   said center and end passages providing an opening in said center wall;
   a pair of slots, said slots located within said bottom surface midway between said ends;
   said fastener comprising an elongated fastener chosen from among a group comprising: nail, bolt, screw, and nut and bolt combination; and
   a mounting passage, said mounting passage extending between said first and second surfaces and adapted to receive said fastener.

2. The device of claim 1, wherein:
   said center and end passages are circular.

3. The device of claim 1, wherein:
   said body is plastic.

4. The device of claim 1, wherein:
   said body is metal.

5. The device of claim 1, wherein:
   said fastener is an adhesive; and
   said adhesive is located on said second surface.

6. A device for attaching an elongated member to a structure, which comprises:
   an elongated, contiguous body;
   said body having a first wall, a second wall, and opposite ends, said ends having a rounded configuration;
   said second wall having a second surface;
   a center wall, said center wall extending between said first wall and said second wall, said center wall spanning a length of said body interior along a midpoint of said body;
   a support rib, said support rib extending between said first wall and said second wall, said support rib spanning a width of said body;
   a center passage, said center passage located between said ends, said center passage providing a transverse opening in said center wall; and a pair of end passages, said end passages located within said ends, said end passages providing a transverse opening in said center wall;
   a pair of rectangular slots, said slots located along opposite edges of said second wall midway between said ends; and
   a mounting passage, said mounting passage extending between said first wall and said second wall.

7. The device of claim 6, further comprising:
   an elongated fastener; and
   said mounting passage being adapted for receiving said elongated fastener.

8. The device of claim 7, wherein:
said elongated fastener is selected from a group consisting of a nail, bolt, screw, and nut and bolt combination.

9. The device of claim 6, wherein:
said body having at least three ribs.

10. The device of claim 6, wherein:
said center passage and end passages are circular.

11. The device of claim 6, wherein:
said body is manufactured from plastic.

12. The device of claim 6, wherein:
said body is manufactured from metal.

13. The device of claim 6, further comprising:
an adhesive; and
said adhesive is located on said second surface.

14. A device for attaching an elongated member to a structure, which device comprises:
an elongate, contiguous body having a plurality of interior cavities;
said body having a first wall and a second wall;
said second wall having a second surface;
said body having opposite ends, said ends having a rounded configuration;
a center wall, said center wall extending between said first wall and said second wall, said center wall spanning a length of said body interior along a midpoint of said body;
at least three support ribs, said support ribs extending between said first wall and said second wall, said support ribs spanning a width of said body;
a circular center passage, said center passage located midway between said body ends, said passage providing a transverse opening in said center wall;
a pair of circular end passages, said end passages located within said ends of said body, said passages providing a transverse opening in said center wall;
wherein said circular passages are sized to accept conduit or piping of a pre-specified diameter;
a pair of rectangular slots, said slots located along opposite edges of said second wall midway between said ends;
an elongated fastener; and
a mounting passage, said mounting passage extending between said first wall and said second wall and adapted for receiving said fastener.

15. The device of claim 14, wherein:
said elongated fastener is selected from a group consisting of a nail, bolt, and screw.

16. The device of claim 14, further comprising:
an adhesive; and
said adhesive is located on said second surface.

* * * * *